United States Patent [19]
Yamanaka et al.

[11] Patent Number: 5,199,272
[45] Date of Patent: Apr. 6, 1993

[54] IDLING SPEED CONTROL SYSTEM

[75] Inventors: Yasushi Yamanaka, Nakashima; Shigeo Numazawa, Nagoya; Hideki Suzuki, Chita; Hiroshi Kishita; Yasuyuki Nishi, both of Kariya, all of Japan

[73] Assignee: Nippondenso Co., Ltd., Kariya, Japan

[21] Appl. No.: 893,848

[22] Filed: Jun. 4, 1992

[30] Foreign Application Priority Data

Oct. 9, 1991 [JP] Japan .................. 3-261953

[51] Int. Cl.⁵ .................................................. B60H 1/32
[52] U.S. Cl. .................................... 62/133; 62/228.4; 123/339
[58] Field of Search ............... 62/133, 228.4, 209; 123/339

[56] References Cited

U.S. PATENT DOCUMENTS

| | | | |
|---|---|---|---|
| 4,856,291 | 8/1989 | Takahashi | 62/217 |
| 5,018,362 | 5/1991 | Nagase et al. | 62/133 |

FOREIGN PATENT DOCUMENTS

| | | |
|---|---|---|
| 59-92212 | 5/1984 | Japan . |
| 62-41951 | 2/1987 | Japan . |
| 62-218670 | 9/1987 | Japan . |
| 236899 | 3/1989 | Japan .................. 62/133 |
| 427723 | 4/1992 | Japan . |

OTHER PUBLICATIONS

Copending U.S. Patent Appln. of Yamanaka, et al., Ser. No. 07/864,771, filed on Apr. 7, 1992.

Primary Examiner—William E. Wayner
Attorney, Agent, or Firm—Cushman, Darby & Cushman

[57] ABSTRACT

In idling speed control system for an engine, for use with a refrigeration circuit for circulating refrigerant through a variable capacity type compressor driven by the engine, a condenser and an evaporator, an idling adjuster is provided to adjust a quantity of an air flow bypassing a throttle valve disposed in a suction passage of the engine and sucked into a combustion chamber of the engine. The control system is arranged to detect Numerical information required for calculating a first influence degree given to an output of the engine by the compressor during operation of the refrigeration circuit, to estimate, in accordance with the numerical information, a second influence degree which will be given to the engine output by the compressor under condition that the engine drives the compressor at a predetermined idling speed and the refrigeration circuit is maintaining cooling ability in a predetermined state. The control system is further arranged to output a control signal dependent on the estimated second influence degree to the idling adjuster prior to idling operation of the engine and for rendering the idling adjuster adjusting the bypassed air flow quantity in accordance with the estimated second influence degree.

11 Claims, 5 Drawing Sheets

IDLING SPEED CONTROL SYSTEM

BACKGROUND OF THE INVENTION

1. Field of the Invention

The present invention relates to an idling speed control system for an engine of an automotive vehicle, and more particularly to an idling speed control system for controlling an idling speed of the engine in accordance with operation of a refrigeration circuit of an air conditioner or the like for the vehicle.

2. Description of Prior Art

When an engine is maintained in idling operation in such prior art as disclosed in the laid-open Japanese patent publication No. 41951/1987, a quantity of an air-fuel mixture sucked into the engine in operative condition of a refrigeration circuit is controlled to increase compared with the air-fuel mixture quantity in inoperativeness of the refrigeration circuit, taking account of pressure in a high-pressure circuit portion of the refrigeration circuit. This prevents rough idling or stalling of the engine, even if load acting on the refrigeration circuit increases.

When a variable capacity type compressor is adopted as a compressor of the refrigeration circuit, large driving torque is required for driving the compressor, because of an increase in capacity of the compressor as decrease of a rotational speed of the compressor if a quantity of refrigerant circulated through the refrigeration circuit is maintained in constant. When release of an accelerator pedal for the vehicle changes an operative state of the engine from a normal running state to an idling state, the actual rotational speed of the engine is lowered suddenly down to a predetermined idling speed, whereas the actual capacity of the compressor is changed rapidly from a small capacity to a large capacity in such a manner to maintain a required quantity of the refrigerant to be circulated. Thus, a quantity of the refrigerant to be circulated immediately after change of the engine to the idling operation is maintained in a value required immediately before change of the engine to the idling operation without sudden changes of refrigerant quantity. Furthermore, a load acting on the engine is suddenly increased due to a sudden increase of the driving torque for the compressor, at the time when an operative state of the engine changes from the normal running state to the idling state.

If an increase of an air-fuel mixture during the idling operation of the engine is not so set large, a quantity of an air-fuel mixture supplied to the engine becomes short to thereby cause rough or stalling operation of the engine upon change of the engine to the idling operation, when cooling ability of the refrigeration circuit before change of the to the idling operation is maintained high to maintain the compressor driving torque and refrigerant flow quantity increased. If an increase of an air-fuel mixture during the idling operation of the engine is inversely set large, a quantity of the air-fuel mixture supplied to the engine in its idling operation is excessively increased to cause bad fuel consumption when cooling ability of the refrigeration circuit before change of the engine to the idling operation is not so maintained high or a quantity of the refrigerant to be circulated is not so maintained much.

SUMMARY OF THE INVENTION

It is therefore the primary object of the present invention to provide an idling speed control system for an engine capable of estimating driving torque for a variable capacity type compressor required for maintaining a quantity of refrigerant to be circulated through a refrigeration circuit during a normal running state of the engine under condition that the compressor is driven under a predetermined idling speed of the engine, thereby to ensure a proper idling speed of the engine.

According to the present invention, there is provided an idling control system for an engine of an automotive vehicle which is equipped with a refrigeration circuit for circulating refrigerant through a compressor, which is variable in a capacity of the discharged refrigerant, driven by the engine, a condenser and an evaporator, the idling speed control system comprising:

control means for controlling a quantity of an air flow sucked into a combustion chamber of the engine, detecting means for detecting numerical information required for measuring or calculating a first influence degree given to an output of the engine by the compressor during operation of the refrigeration circuit, estimating means for estimating, in accordance with the numerical information, a second influence degree which will be given to the engine output by the compressor and will be required for maintaining cooling ability of the refrigeration circuit in a predetermined state under condition that the engine drives the compressor at a predetermined idling speed, and output means for outputting a control signal dependent on the estimated second influence degree to the control means prior to idling operation of the engine and for rendering the control means controlling the quantity of the air flow in accordance with the estimated second influence degree.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
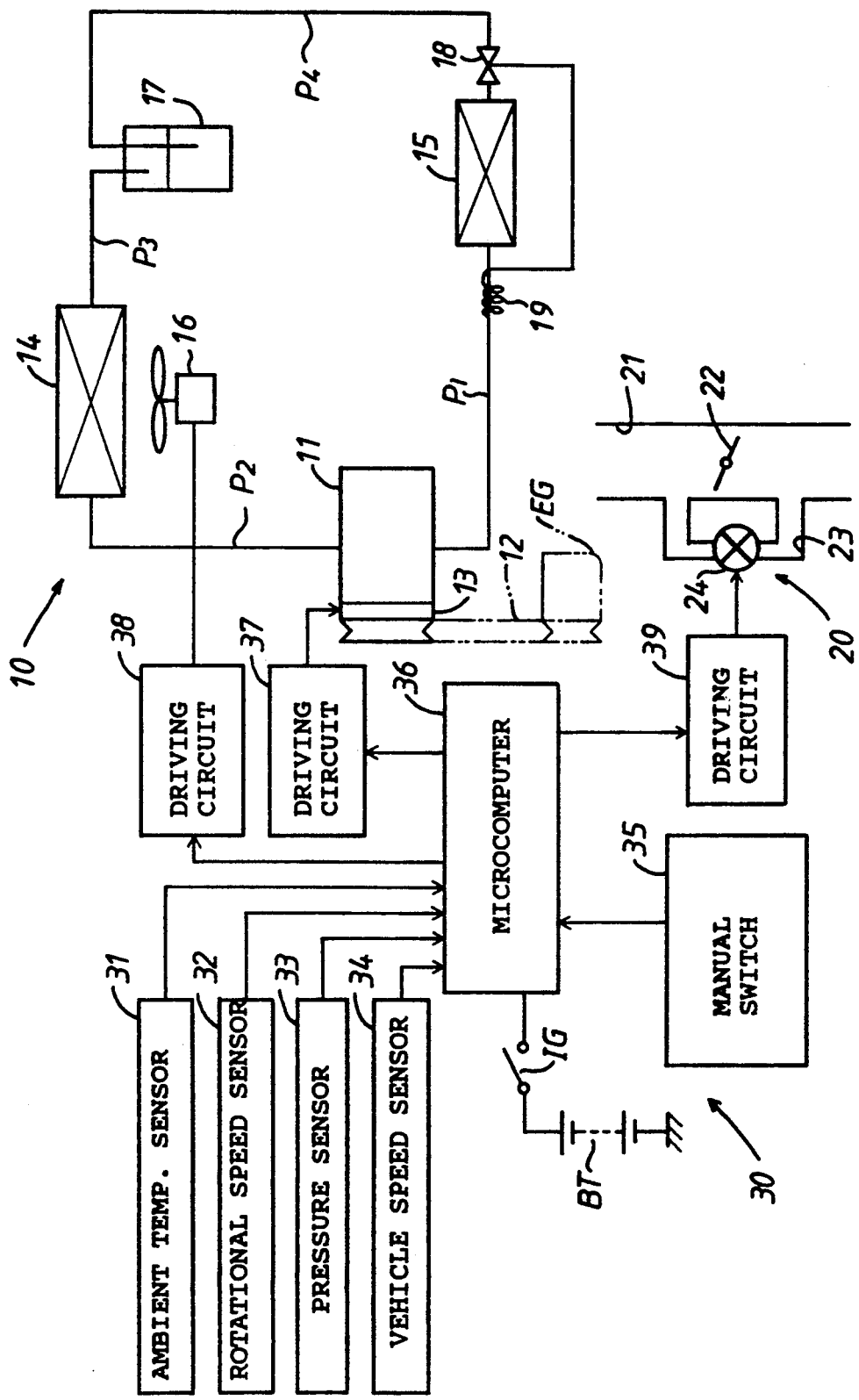
FIG. 1 is a block diagram of an embodiment in accordance with the present invention.

Referring to FIG. 1 of the drawings, there is illustrated an idling speed control system in accordance with the present invention adapted to an internal combustion engine EG of an automotive vehicle which is provided therein with an air conditioner having an refrigeration circuit or refrigeration cycle 10. The engine EG has a suction passage 21 including a throttle valve 22 which is operatively coupled to an accelerator pedal of the vehicle. The throttle valve 22 is adjusted at its opening degree in accordance with an depression degree of the accelerator pedal to control an amount of an air flow flowing into a combustion chamber of the engine EG through the suction passage 21. The refrigeration circuit 10 includes a variable capacity type or capacity-controlled type compressor 11 which is selectively driven by the engine EG through an electromagnetic clutch 13 and a V-belt mechanism 12 and sucks thereinto refrigerant from a low-pressure pipe P1 of the refrigeration circuit 10 to compress the refrigerant so as to supply the compressed refrigerant into a high-pressure pipe P2. Thus, the compressed refrigerant from the pipe P2 is recirculated through a condenser 14, a receiver 17, an expansion valve 18 and an evaporator 15 of the refrigeration circuit 10.

The condenser 14 is provided within an engine room for the engine EG and condenses the compressed refrigerant from the high-pressure pipe P2 in accordance with cooling operation of a cooling fan 16. The receiver 17 is supplied with the condensed refrigerant through a high-pressure pipe P3 from the condenser 14 to separate the same refrigerant into gas and liquid components. The liquid component from the receiver 17 is supplied as circulating refrigerant through a pipe P4 into the evaporator 15 which cools an air flow to be applied into a compartment of the vehicle. The expansion valve 18 is disposed into the pipe P4 and has a thermo-element 19 which is mounted on the pipe P1 to detect the actual temperature of the refrigerant from the evaporator 15. Thus, an opening degree of the expansion valve 18 is determined in accordance with the detected temperature of the thermo-element 19. This means that the refrigerant from the pipe P4 into the evaporator 15 is expanded by the expansion valve 18 in accordance with the opening degree of the expansion valve 18.

The idling speed control system includes an idling adjuster 20 which includes a bypass passage 23, of which one end is connected to a portion of the suction passage 21 at the upstream of the throttle valve 22 and of which the other end is connected to another portion of the suction passage 21 at the downstream of the throttle valve 22. The idling adjuster 20 has an idling control valve 24 which is disposed within the bypass passage 23. The control valve 24 is electrically controlled in its opening degree to adjust an amount of an air flow flowing into the combustion chamber of the engine EG through the bypass passage 23. In addition, an amount of fuel supplied into the combustion chamber of the engine EG is controlled in proportion to the amount of the air flow flowing into the combustion chamber to form air-fuel mixture to be ignited in the combustion chamber.

An electric control apparatus 30 includes an ambient temperature sensor 31 which is arranged between the condenser 14 and a front grill of the automotive vehicle. The ambient temperature sensor 31 detects the actual temperature Tac of an air flow flowing through the condenser 14 from the outside of the vehicle into the engine EG and generates a detecting signal indicative of the detected ambient temperature Tac. A rotational speed sensor 32 is mounted on the compressor 11 and detects the actual rotational speed Nc of the compressor 11 to generate a detecting signal indicative of the detected rotational speed Nc. A pressure sensor 33 is mounted on a portion of the pipe P4 near an outlet of the receiver 17 and detects the actual pressure Ph of the refrigerant within the portion of the pipe P4 or the high-pressure side passage of the refrigerant to generate a detecting signal indicative of the detected refrigerant pressure in the high-pressure side passage. A vehicle speed sensor 34 detects the actual rotational speed of an output shaft of a transmission of the vehicle, a wheel of the vehicle or the like to generate a detecting signal indicative of the actual vehicle speed s. A manual switch 35 is manipulated when activates the air conditioner.

Figure 2:
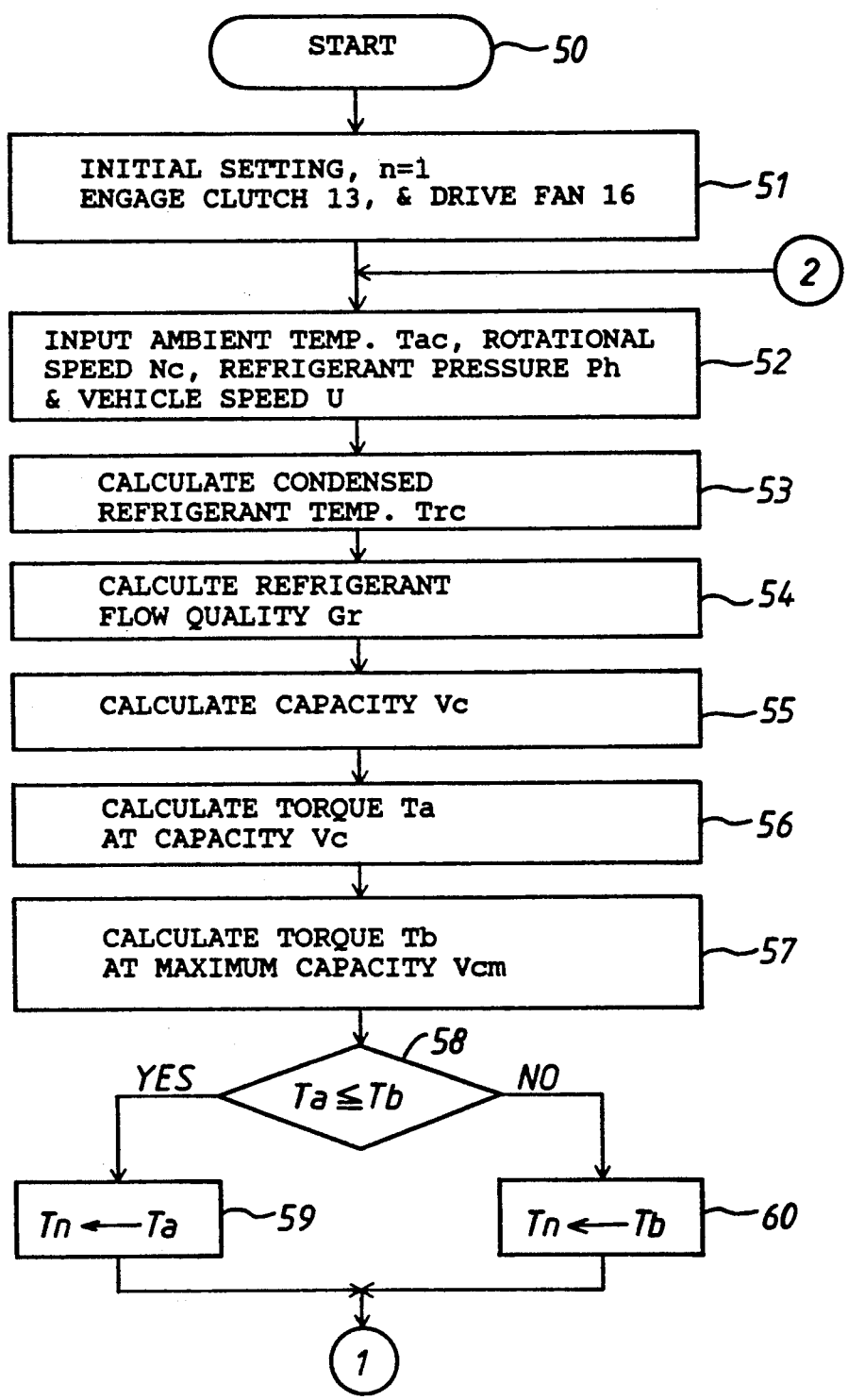
FIGS. 2 and 3 are a flow diagram indicative of operation of the microcomputer shown in FIG. 1.
Figure 3:
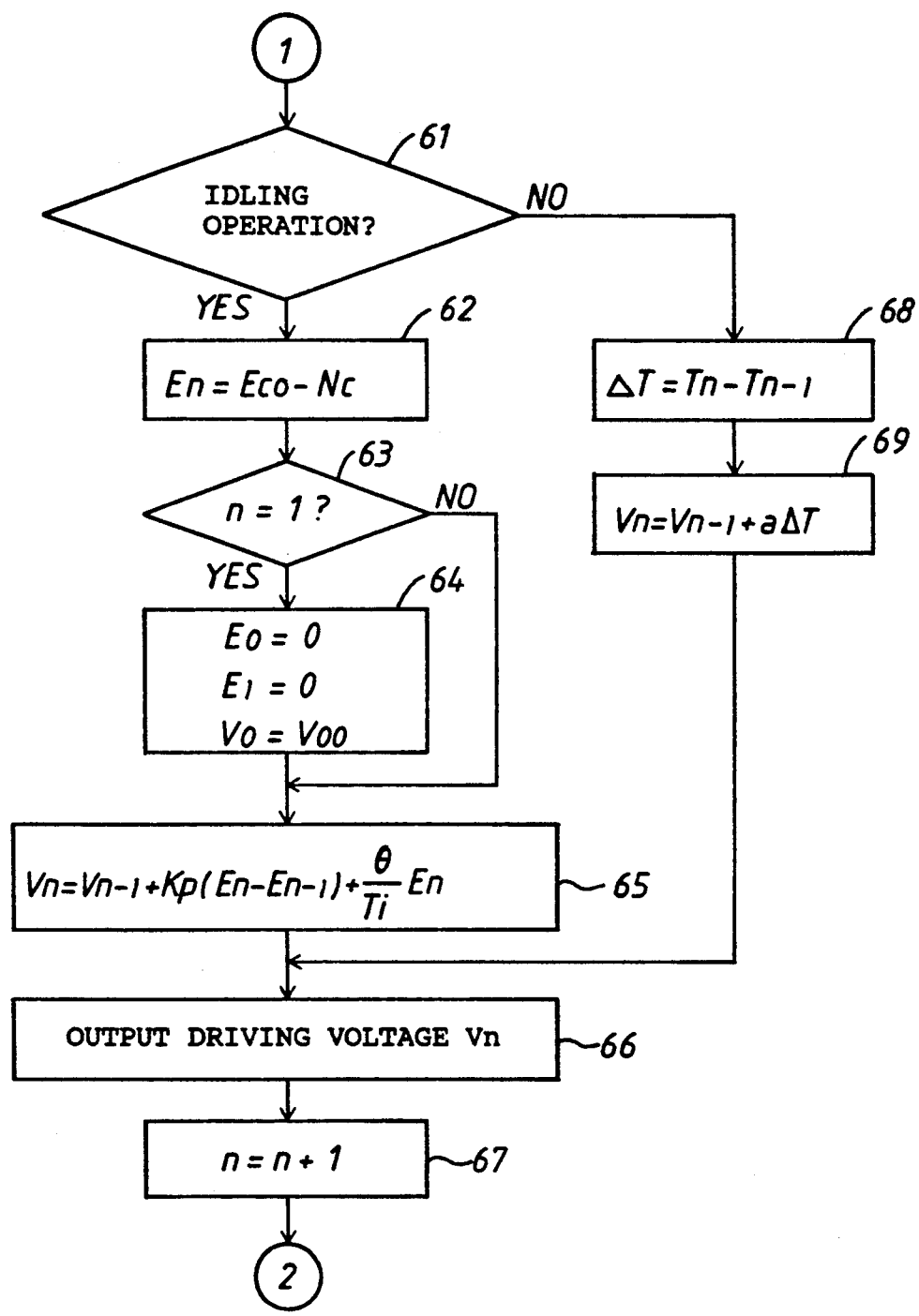

A microcomputer 36 is connected to the sensors 31 to 34 and performs a program, defining a flow diagram shown in FIGS. 2 and 3, to control the electromagnetic clutch 13, cooling fan 16 and control valve 24 by way of driving circuits 37 to 39 respectively. The program is stored previously in a ROM of the microcomputer 36. The driving circuit 37 is controlled by the microcomputer 36 to selectively engage the electromagnetic clutch 13. The driving circuit 38 is controlled by the microcomputer 36 to selectively drive the cooling fan 16. The driving circuit 39 is controlled by the microcomputer 36 to selectively drive the control valve 24. The microcomputer 36 is supplied with electric energy from a battery BT through an ignition switch IG of the automotive vehicle.

Figure 4:
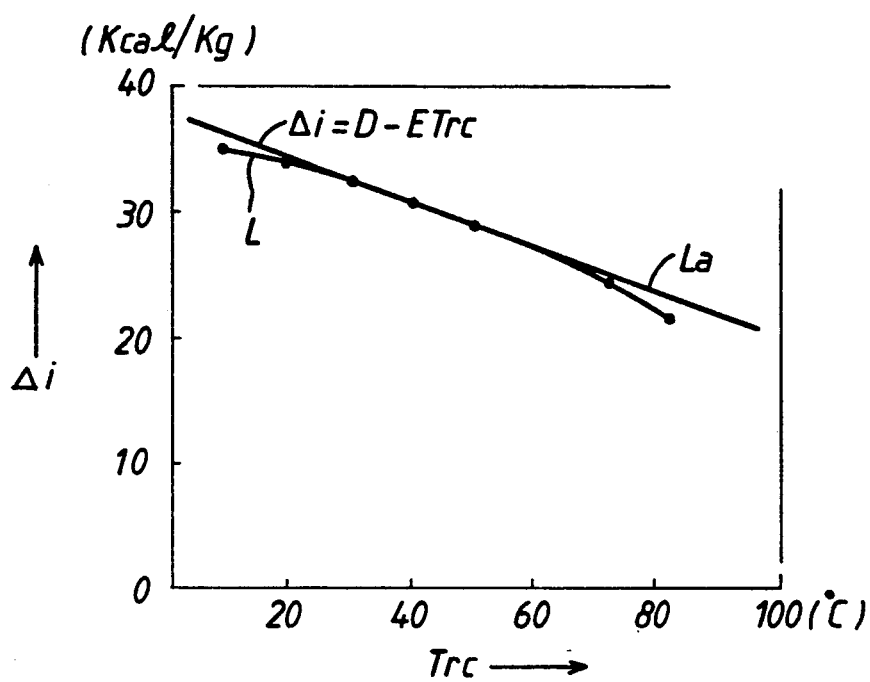
FIG. 4 depicts characteristic data defining relationship between a temperature Trc of condensed refrigerant and a refrigerant enthalpy $\Delta i$.

In operation, when the ignition switch IG is actuated, the engine EG is started, and the microcomputer 36 is conditioned in its operation. When the manual switch 35 is actuated, the microcomputer 36 starts to perform execution of the program at a step 50 in accordance with the flow diagram shown in FIGS. 3 and 4. After initial setting at a step 51, the microcomputer 36 performs repeatedly execution through steps 52 to 69 of the program. In addition, the microcomputer 36 sets a variable n equal to "1" at step 51 and simultaneously generates a clutch control signal and a fan control signal therefrom.

Then, the driving circuit 37 is responsive to the clutch control signal from the microcomputer 36 to engage the clutch 13. Thus, an output power from the engine EG is supplied to the compressor 11 through the V-belt mechanism 12 and the clutch 13 to drive the compressor 11. The driving circuit 38 is responsive to the fan control signal from the microcomputer 36 to drive the cooling fan 16. As a result, the refrigerant discharged from the compressor 11 is circulated through the condenser 14, receiver 17, expansion valve 18 and evaporator 15 to cool an air flow to be supplied into the vehicle compartment.

During the above-mentioned execution through the steps 52 to 69 of the program, the microcomputer 36 is applied at step 52 with detecting signals indicative of ambient temperature Tac, rotational speed Nc, refrigerant pressure Ph and vehicle speed U respectively from the sensors 31 to 34 to store therein the ambient temperature Tac, rotational speed Nc, refrigerant pressure Ph and vehicle speed U temporarily. In this case, the ambient temperature Tac, rotational speed Nc, refrigerant pressure Ph and vehicle speed U are used, as described later, as values for calculating a quantity of refrigerant flow under operation of the air conditioner 10 or for calculating driving torque of the compressor 11.

When ended the execution at the step 52, the microcomputer 36 performs execution at steps 52 to 60 and thereafter determines at step 61 as to whether the engine EG is maintained in its idling operation or not. This determination is done on a basis of the rotational speed Nc of the compressor 11 which is substantially equal to a rotational speed of the engine EG. In the embodiment, the determination at step 61 is done as to whether or not the rotational speed Nc is maintained in a predetermined rotational speed range, for instance 600(r.p.m.) to 800(r.p.m.).

At this stage, the engine EG is maintained in its idling operation because the time is not hardly elapsed after closing of the ignition switch IG. Thus, the microcomputer 36 determines an "YES" answer at step 61 to advance the program to the steps 62 to 65. When the program proceeds to step 63, the microcomputer 36 determines an "YES" answer to advance the program to step 64 at which initial values E0 and E1 of a deviation En are set to zero and which an initial value V0 of a driving voltage Vn for the control valve 24 is set to a predetermined voltage V00. The deviation En indicates a difference (Nco−Nc) between an optimal rotational speed Nco of the compressor 11 and the rotational speed Nc. The optimal rotational speed Nco is predetermined usually to be a predetermined rotational speed for instance about 700 (r.p.m.) of compressor 11 during idling of the engine EG. In the embodiment, however, the optimal rotational speed Nco is set to a value larger slightly than 700 (r.p.m.) when the engine EG is conditioned in its warming operation or the like. The predetermined voltage V00 is predetermined to be a value causing a rotational speed of the engine EG to be equal to the optimal rotational speed Nco, in case an opening degree of the control valve 24 is adjusted by the predetermined voltage V00 with the throttle valve 22 closed.

After the execution at the step 64 as previously described, the microcomputer 36 calculates at step 65 a driving voltage Vn in accordance with the following equation (1).

$$Vn = Vn-1 + Kp \cdot (En - En-1) + (\theta/Ti) \cdot En \qquad (1).$$

In the equation (1), coefficients Kp, $\theta$, Ti are predetermined control constants respectively. At this stage, the driving voltage Vn is set to the predetermined voltage V00 from the equation (1) with the deviations En(=E1) and En−1(=E0) equal to zero respectively.

When the driving voltage Vn is set, as previously described, the microcomputer 36 generates at the following step 66 a control signal indicative of the driving voltage Vn, in response to which the driving circuit 39 drives the control valve 24 to control the actual opening degree of the control valve 24 in proportion to the driving voltage Vn (=V00). This means that a quantity of an air flow through the bypass passage 23 sucked into the engine EG is determined in proportion to the driving voltage Vn. Thus, an air-fuel mixture is formed by the quantity of the air flow and a quantity of fuel proportional to the air flow quantity and flows into the combustion chamber of the engine EG to control output torque of the engine EG.

After the execution of the step 66, the microcomputer 36 adds at step 67 "1" to the variable n and returns the program to step 52 to continue repetitive execution through steps 52 to 67 of the program as long as the engine EG is maintained in its idling operation. During the repetitive execution, the variable n becomes larger than "1" by performance of the microcomputer 36 at step 67. Thus, the microcomputer 36 determines a "NO" answer repetitively at step 63 and executes steps 62, 65 and 66 of the program to continuously control the actual opening degree of the control valve 24.

In this instance, the microcomputer 36 calculates at step 62 a deviation En between the optimal and actual rotational speeds Nco and Nc of the compressor 11 on a basis of the following equation (2).

$$En = Nco - Nc \qquad (2).$$

Thereafter, the microcomputer 36 adds at step 65 a value $(\theta/Ti) \cdot En$ proportional to the deviation En to the previously executed driving voltage Vn−1 on a bases of the equation (1) to thereby update the driving voltage Vn at each cycle execution thereof. Thus, an amount of an air-fuel mixture sucked into the engine EG is controlled in proportion to the updated driving voltage Vn by execution of the microcomputer 36 at step 66 to maintain the actual rotational speeds of the engine EG and compressor 11 in the optimal rotational speed Nco. The rotational speed of the compressor 11 is smoothly controlled towards the optimal rotational speed Nco owing to the Kp·(En−En−1) of the equation (1).

When the throttle valve 22 is opened by depression of the accelerator pedal in such idling operation of the engine EG, an amount of an air flow flowing into the suction passage 21 is increased in accordance with the opening of the throttle valve 22 to increase an amount of fuel or an air-fuel mixture sucked into the engine EG through the throttle valve 22. Thus, the actual rotational speed of the engine EG is increased to increase the actual rotational speed Nc of the compressor 11. This means that the rotational speed Nc is not maintained in the predetermined rotational speed range (600 to 800(r.p.m.)) defining idling operation of the engine EG. Therefore, the microcomputer 36 determines a "NO" answer at step 61 to calculate a torque deviation $\Delta T$ and a driving voltage Vn at steps 68 and 69 and then repetitively perform execution of the program through steps 68, 69, 66, 67 and 52 to 61.

At this stage, processings of the microcomputer 36 at steps 53 to 60 will be described, prior to explanation of processings at steps 68 and 69, because driving torque Tn of compressor 11 calculated at steps 53 to 60 is utilized for calculation of the torque deviation $\Delta T$. When the program proceeds to step 53, the microcomputer 36 calculates a temperature Trc of the condensed refrigerant at the condenser 14 in accordance with the high-pressure side refrigerant pressure Ph stored at step 52 on a basis of the following equation (3) defining relationship between the refrigerant pressure Ph and the temperature Trc of the condensed refrigerant.

$$Trc = f(Ph) \qquad (3).$$

Then, the microcomputer 36 calculates at step 54 a quantity Gr(Kg/hour) of the refrigerant circulating through the refrigeration circuit 10 on a basis of the following equation (4) in accordance with the calculated temperature Trc of the condensed refrigerant and the ambient temperature Tac and vehicle speed U stored at the step 52. this means that the ambient temperature Tac, refrigerant pressure Ph and vehicle speed U are parameters for calculating the refrigerant flow quantity Gr.

$$Gr = A \cdot (B + C \cdot U) \cdot (Trc - Tac)/(D - E \cdot Trc) \qquad (4).$$

In the equation (4), the reference characters A,B,C,D and E indicate predetermined coefficients respectively. For instance, A=0.24, B=1200, C=10, D=38 and E=0.18.

Hereinafter, theoretical grounds of the equation (4) will be described in detail. The inventors have tried to find out relationship between the ambient temperature Tac and the refrigerant temperature Trc on a basis of general physical phenomena that when a difference between the actual temperature on an outer periphery of the condenser 14 or the ambient temperature Trc and the temperature Trc of the refrigerant in the condenser 14 is maintained large, thermal radiation ability of the condenser 14 is maintained high to increase the refrigerant flow quantity Gr and also that when the difference between the ambient temperature Trc and the temperature Trc of the refrigerant is maintained small, the thermal radiation ability of the condenser 14 is maintained low to decrease the refrigerant flow quantity Gr.

It is in general known that an amount Qrc of thermal radiation of the refrigerant condensed within the condenser 14 is defined by the following equation (5) in relation to the refrigerant flow quantity Gr and enthalpy $\Delta i$ (Kcal/Kg) of refrigerant between refrigerant inlet and outlet of the condenser 14.

$$Qrc = \Delta i \cdot Gr \tag{5}$$

In the equation (5), the enthalpy $\Delta i$ of refrigerant corresponds mainly to latent heat of the condensed refrigerant and is defined as a function of the condensed refrigerant temperature Trc when the kind of the refrigerant is specified. Assuming that the refrigerant is R12, it has been experimentally recognized that the relationship between the condensed refrigerant temperature Trc and the enthalpy $\Delta i$ of refrigerant is indicated by a characteristic curve L shown in FIG. 4. In this instance, the enthalpy $\Delta i$ of refrigerant is defined by the following equation (6) when the approximation to the curve L is indicated by a linear line La shown in FIG. 4.

$$\Delta i = D - E \cdot Trc \tag{6}$$

the equation (5) is therefore modified into the following equation (7).

$$Qrc = (D - E \cdot Trc) \cdot Gr \tag{7}$$

In the equations 6 and 7, coefficients D and E are constants respectively. In the embodiment, D=38 and E=0.18.

Meanwhile, It is in general known that an amount Qac of thermal radiation from the condenser 14 toward the outside is defined by the following equation (8) in relation to the ambient temperature Tac on the surface of the condenser 14.

$$Qac = A \cdot Gac \cdot \Phi \cdot (Trc - Tac) \tag{8}$$

In the equation (8), the reference character Gac indicates an amount (Kg/hour) of an air flow flowing into the condenser 14 from the outside of the vehicle. the reference character $\Phi$ indicates efficiency in temperature of the air flow. A coefficient A is a constant equal to 0.24.

Figure 5:
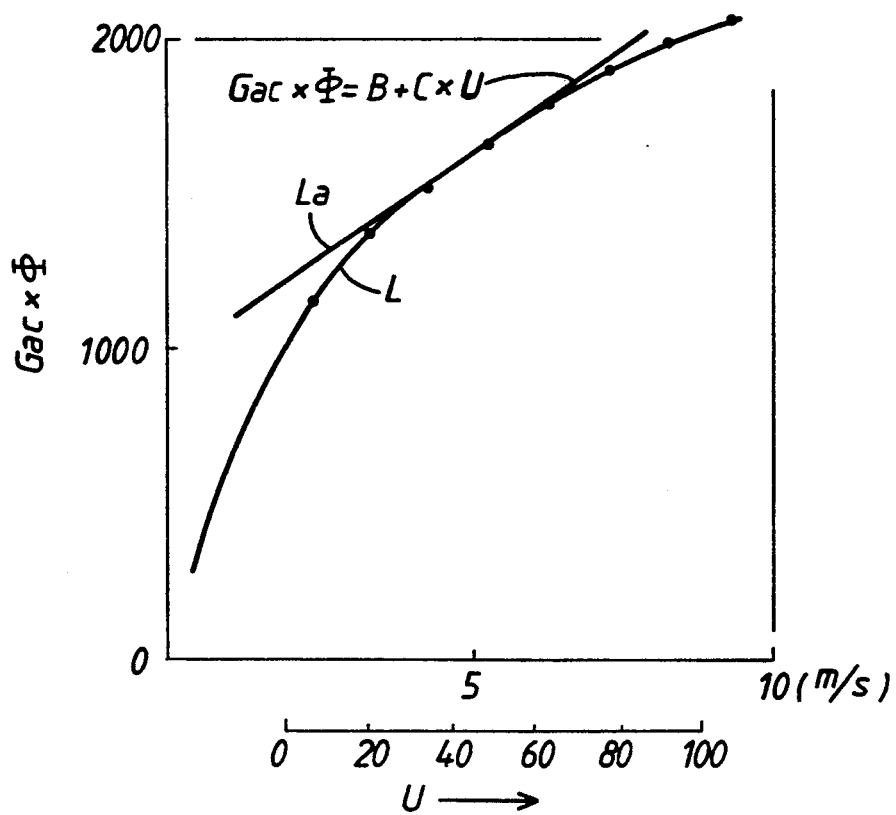
FIG. 5 depicts characteristic data defining relationship between a vehicle speed U and a value Gac.$\Phi$.

Furthermore, it has been experimentally recognized that relationship between the value Gac·$\Phi$ of equation (8) and the vehicle speed U is defined by a characteristic curve L shown in FIG. 5, taking account of the fact that a speed of the air flow flowing onto the outer surface of the condenser 14 from the outside of the vehicle corresponds to the vehicle speed U. When the approximation to the characteristic curve L is indicated by a linear line La shown in FIG. 5, the value Gac·$\Phi$ of equation (8) is given by the following equation (9).

$$Gac \cdot \Phi = B + C \cdot U \tag{9}$$

Thus, the equation (8) is modified into the following equation (10).

$$Qac = A \cdot (B + C \cdot U) \cdot (Trc - Tac) \tag{10}$$

In the equation (10), coefficients B and C are constants respectively. The coefficient B takes 1200, and the coefficient C takes 10. In addition, the value Gac·$\Phi$ may be regarded as a constant because an air flow into the condenser 14 is only the air flow from the cooling fan 16 during idling operation of the engine EG.

Taking account of the fact that heat energy of the condensed refrigerant is radiated toward the outside air flow by way of the condenser 14, it may be easily recognized that the amount Qrc of heat radiation of the condensed refrigerant defined by the equation (7) is equal to the amount Qac of heat radiation to the outside from the condenser 14. The equation (4) is therefore given by the equations (7) and (10). As a result, it may be understood that the amount Gr of the refrigerant circulated through the refrigeration circuit 10 is calculated on a basis of the equation (4).

After processings at the step 54, the microcomputer 36 calculates at step 55 an estimated capacity Vc of the compressor 11 on a basis of the following equation (11) in accordance with the calculated refrigerant flow quantity Gr.

$$Vc = Gr / (F \cdot Nco) \tag{11}$$

In the equation (11), the reference character F indicates a constant which is equal to $(9.2 \times 10^{-4})$. The reference character Nco indicates an optimal rotational speed (for instance 700(r.p.m.)) of compressor 11 during idling operation of engine EG. Thus, an estimated capacity of compressor 11 for maintaining the calculated refrigerant flow amount Gr is calculated on a basis of assumption that the engine EG rotates with the optimal rotational speed Nco.

When the program proceeds to step 56, the microcomputer 36 calculates estimated driving torque Ta for the compressor 11 on a basis of the following equation (12) in accordance with the estimated capacity Vc and the stored high-pressure side refrigerant pressure Ph obtained at step 52. The calculated estimated driving torque Ta corresponds to a value when a capacity of compressor 11 is assumed equal to the estimated capacity Vc.

$$Ta = K \cdot Ps \cdot \{(Ph/Ps)^m - 1\} \cdot Vc \tag{12}$$

Figure 6:
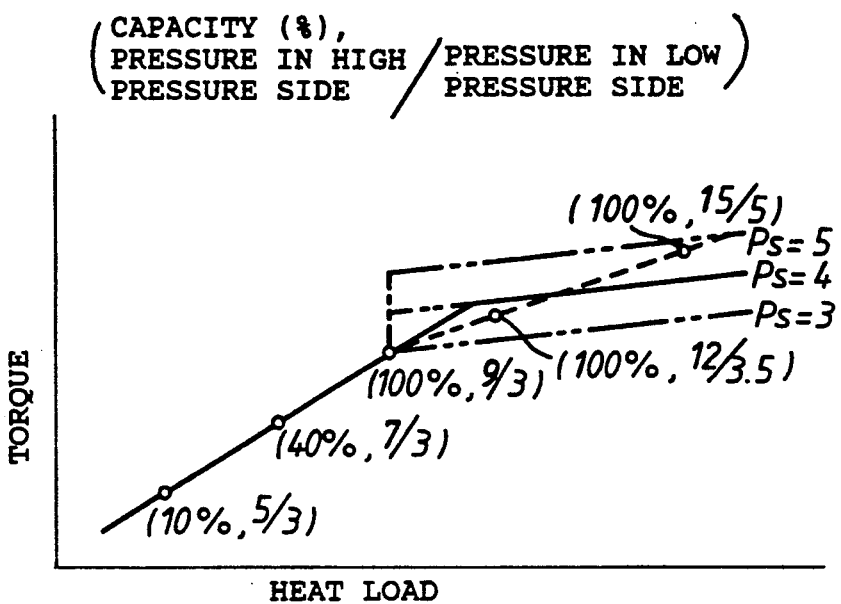
FIG. 6 depicts characteristic data defining relationship between a heat load acting on the variable capacity type compressor shown in FIG. 1 and driving torque for the compressor.

In the equation (12), the reference character K indicates a constant equal to $2 \times 10^{-2}$, and the reference character m indicates a constant equal to 0.123. The reference character Ps indicates the low pressure side refrigerant pressure in the pipe P1. The refrigerant pressure Ps is determined a predetermined value of $(3(Kg/cm^2))$ because it is fixed to be about 3 $(Kg/cm^2)$ if a heat load acting on the compressor 11 changes in a variable range of the capacity of the compressor 11 as shown by a solid line portion defining a range of lower than or equal to 100(%) of the capacity percentage in FIG. 6. Additionally, each of the pressure Ph and Ps indicates an absolute value.

Furthermore, the microcomputer 36 calculates at step 57 estimated driving torque Tb for the compressor 11 on a basis of the following equation (13) in accordance with the refrigerant pressure Ph and Ps. The calculated estimated driving torque Tb corresponds to a value when a capacity of compressor 11 is assumed equal to the maximum capacity Vcm.

$$Tb = K \cdot Ps \cdot \{(Ph/Ps)^m - 1\} \cdot Vcm \tag{13}$$

In the equation (13), the reference characters K and m are the same values as those of the equation (12). However, the low pressure side refrigerant pressure Ps takes a constant value (4($Kg/cm^2$)) because it varies over 3 to 5 ($Kg/cm^2$) in accordance with increase of an heat load acting on the compressor 11 as shown by a dotted line portion defining a range of lower than or equal to 100(%) of the capacity percentage in FIG. 6. From the above description, it is understood that under the processings at steps 56 and 57, each of the estimated driving torque Ta and Tb for maintaining the refrigerant flow amount Gr is calculated on a basis of assumption that the engine EG is rotating with the optimal rotational speed Nco (or the rotational speed of the compressor 11 during the idling operation of the engine EG) in case the compressor 11 is driven in the variable capacity range and maximum capacity.

After calculating the estimated driving torque Ta and Tb at steps 56 and 57, the microcomputer 36 compares the estimated driving torque Ta with the estimated driving torque Tb at step 58. When the estimated torque Ta in the variable capacity range is smaller than or equal to the estimated torque Tb in the maximum capacity, the microcomputer 36 determines at step 58 an "YES" answer to set at step 59 the updated estimated driving torque Ta into estimated driving torque Tn. When the estimated torque Tb is smaller than the estimated torque Ta, the microcomputer 36 determines at step 58 a "NO" answer to set at step 60 the updated estimated driving torque Tb into the estimated driving torque Tn.

Hereinafter described is the reason why each of the estimated driving torque Ta and Tb is calculated at steps 56 and 57 and the minimum value of the torque Ta and Tb is set into the estimated driving torque Tn at steps 58 to 60. After the capacity of the compressor 11 has reached to the maximum capacity Vcm, the low pressure side refrigerant pressure Ps changes toward 3 to 5 ($Kg/cm^2$). Thus, the estimated torque Tn for the compressor 11 changes in accordance with the dotted line of FIG. 6 via increase of a heat load acting on the compressor 11. However, for ensuring precise calculation of the estimated driving torque Tn after the capacity of the compressor 11 has reached to the maximum value Vcm, the estimated torque Tn is calculated to be a value changing as the solid line of FIG. 6 owing to the fixed value of the pressure Ps thereby to approximate the torque Tn to changing value of the pressure Ps.

After calculation of the estimated driving torque Tn, the program proceeds to step 61 and thereafter, as in the followings. At this stage the engine EG is maintained in its normal running operation. Thus, the microcomputer 36 determines at step 61 a "NO" answer and in turn calculates at step 68 a torque deviation ΔT on a basis of the following equation (14) in accordance with the updated estimated driving torque Tn and the previous estimated driving torque Tn−1.

$$\Delta T = Tn - Tn - 1 \tag{14}$$

In the equation (14), the previous estimated driving torque Tn−1 has been temporarily stored in the microcomputer 36 at the steps 59 and 60.

Thereafter, the microcomputer 36 calculates a driving voltage Vn on a basis of the following equation (15) in accordance with the previously calculated driving voltage Vn−1 and the calculated torque deviation ΔT.

$$Vn = Vn - 1 + a \cdot \Delta T \tag{15}$$

In the equation (15), a coefficient a is a predetermined constant, and the driving voltage Vn−1 is temporarily stored in the microcomputer 36 with the previous processing at step 69. After calculation of the driving voltage Vn at step 69, the microcomputer 36 outputs at step 66 a control signal indicative of the driving voltage Vn to the driving circuit 39, which controls the actual opening degree of the control valve 24 in proportion to the driving voltage Vn.

In other words, a difference between the calculated estimated driving torque Tn and the previously calculated estimated driving torque Tn−1 is calculated as the torque deviation ΔT at step 68, and a value a·ΔT proportional to the torque deviation ΔT is added to the previous driving voltage Vn−1 at step 69. This means that the driving voltage Vn is being updated repetitively. Thus, even if the engine EG is maintained in its normal running operation, the opening degree of the control valve 24 is adjusted to a value necessary for obtaining an estimated driving torque Tn which will be requested on the idling operation of the engine EG after estimated when the engine EG is maintained in its normal running operation. In addition, the throttle valve 22 is maintained opened at this stage. Thus, early adjustment of the opening degree of the control valve 24 will not influence directly the actual rotational speed and output of the engine EG.

When the throttle valve 22 is closed with the accelerator pedal released while the engine EG is maintained in its normal running operation, the engine EG is conditioned in its idling operation due to the actual rotational speed thereof. Therefore, the microcomputer 36 determines again an "YES" answer at step 61 to repetitively perform execution of the program through the steps 62, 63, and 65 to 67. As a result, an amount of an air flow sucked through the control valve 24 into the engine EG or an amount of an air-fuel mixture sucked into the engine EG is maintained in a value proportional to a driving voltage Vn calculated at step 69. In this instance, for calculation of the driving voltage Vn at step 65, the driving voltage Vn−1 calculated at step 69 while the engine EG is maintained in its normal running operation is utilized as an initial value, different from a driving voltage at start of the engine EG, and the driving voltage Vn is repetitively updated taking account of a deviation En between the optimal rotational speed Nco and the rotational speed Nc.

When the actual capacity of the compressor 11 is rapidly increased to maintain a necessary refrigerant flow quantity, immediately after such sudden lowering of the rotational speed of the engine EG, as described above. A quantity of the refrigerant flow circulated through the refrigeration circuit 10 is maintained in a value on or before the engine EG is maintained in its normal running operation. The rotational speed Nc of the compressor 11 suddenly lowers as drop in the rotational speed of the engine EG in case the refrigerant flow quantity Gr is maintained in constant. Thus, the actual capacity of the compressor 11 is suddenly increased to suddenly increase driving torque for the compressor 11. However, it should be noted that the driving voltage Vn for controlling the opening degree of control valve 24 is being updated repetitively on a basis of a driving voltage Vn−1 calculated at step 69, as previously described. Furthermore, it should be noted that this driving voltage Vn−1 has been calculated, when the engine EG has been maintained in its normal running operation, on a basis of assumption that the engine EG should have rotated at the optimal rotational speed Nco and of an estimated driving torque Tn of the compressor 11 for maintaining a refrigerant flow quantity Gr when the engine EG is maintained in its normal running operation. Thus, enough quantity of an air flow or an air-fuel mixture is supplied to the engine EG at once, with no relation to cooling ability of the air conditioner even if operation of the engine EG is changed into its idling operation from its normal running operation. As a result, the engine EG may be maintained in its proper idling operation without rough idling operation, stalling operation or over-speed operation.

In the above embodiment, for calculating the estimated driving torque Ta, Tb of the compressor 11, the condensed refrigerant temperature Trc is calculated on a basis of the high pressure side refrigerant pressure Ph, and the refrigerant flow quantity Gr is calculated by using the calculated refrigerant temperature Trc, the detected ambient temperature Tac and the detected vehicle speed U. And, the estimated capacity Vc is calculated on a basis of the calculated refrigerant flow quantity Gr and the optimal rotational speed Nco (an optimal rotational speed of the compressor 11 during idling operation of the engine EG), and the estimated torque Ta, Tb are calculated by using the calculated estimated capacity Vc and the refrigerant pressure Ph (see steps 53 to 57).

Figure 7:
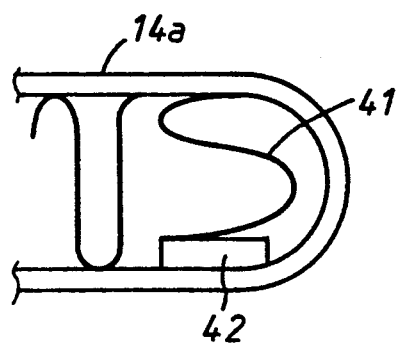
FIG. 7 indicates a partial modification of the embodiment.

However, owing to corresponding relationship between the refrigerant pressure Ph and the condensed refrigerant temperature Trc, condensed refrigerant temperature Trc may be detected in replacement of the refrigerant pressure Ph to calculate the refrigerant pressure Ph. Thus, the detected refrigerant temperature Trc, calculated pressure Ph may be utilized to calculate a capacity Vc and estimated driving torques Ta, Tb. In this case, it is preferable to adopt a temperature sensor which is mounted on an outlet portion of the condenser 14 or the pipe P3 to detect a refrigerant temperature as the condensed refrigerant temperature Trc. Furthermore, in replacement of the above mentioned temperature sensor, there may be, as shown in FIG. 7, adopted a temperature sensor 42 which is supported in pressure by a plate spring 41 on a bending portion of a condensed pipe 14a of the condenser 14 to detect the actual surface temperature as the refrigerant temperature Trc.

In the above embodiment, the refrigerant flow quantity Gr is calculated on a basis of the equation (4) in accordance with the detected refrigerant temperature Tac, the ambient temperature Tac and the vehicle speed U. However, the refrigerant flow quantity Gr may be calculated on a basis of the following equation (16) in accordance with the detected rotational speed Nc of the compressor 11 and the actual capacity Vrc of the compressor 11 which is directly detected.

$$Gr = F \cdot Nc \cdot Vrc \tag{16}$$

Thus, it may be eliminated to detect the ambient temperature Tac and vehicle speed U and to calculate the condensed refrigerant temperature Trc.

In the above embodiment, for calculation of the driving torque Ta, Tb based on the equations (12), (13), the refrigerant pressure Ph may be dealed as a constant and only the estimated capacity Vc may be dealed as a variable.

While in the above embodiment the estimated capacity Vc of the compressor 11 is calculated on a basis of the equation (11), the estimated capacity Vc may be calculated on a basis of the following equation (17), because the actual capacity of the compressor 11 is delayed more than change from the normal running operation of the engine EG to the idling operation, in case the compressor 11 is a compressor which is delayed in change of the capacity.

$$Vc = (Kd \cdot Gr)/(F \cdot Nco) \tag{17}$$

In the equation, a coefficient Kd is a value which is maintained smaller than "1". The coefficient Kd may be a constant or a variable varying in accordance with the refrigerant pressure Ph, the rotational speed Nc or the like.

Although in the above embodiment the refrigerant flow quantity Gr is calculated in relation to heat exchange of the condenser 14, it may be also calculated in relation to heat exchange of the evaporator 15. In this instance, relationship between a heat radiation quantity Qre and refrigerant enthalpy Δ i.e. is represented the following equation (18) corresponding to the equation (5).

$$Qre = \Delta ie \cdot Gr \tag{18}$$

Furthermore, a heat radiation quantity Qae of the evaporator 15 to the outside is represented by the following equation (19) corresponding to the equation (8).

$$Qae = A \cdot Gae \cdot \Phi \cdot (Tac - Tre) \cdot K \tag{19}$$

In the equation (19), the reference character Tae indicates the actual temperature Tae of an air flow flowing into the evaporator 15, and the reference character Tre indicates the actual temperature of refrigerant in the evaporator 15 or at the outlet of the evaporator 15. The value Gae·Φ is determined by a quantity of an air flow from a blower of the air conditioner. The coefficient K is a constant equal to about "2", and the coefficient A is "0.24".

The refrigerant flow quantity Gr is represented by the following equation (20) corresponding to the equation (4), because the heat radiation quantity Qre is equal to the heat radiation quantity Qae.

$$Gr = \{A \cdot Gae \cdot \Phi \cdot (Tac - Tre) \cdot K\}/(\Delta ie) \tag{20}$$

In this case, it is preferable to adopt temperature sensors which detect the actual temperature of an air flow flowing into the evaporator 15 from the outside and the actual temperature of refrigerant near the outlet of the evaporator 15 respectively to be utilized as the air flow temperature Tae and the refrigerant temperature Tre.

The refrigerant temperature Tre may be replaced with the actual temperature of the outlet of the evaporator 15 or the pipe P1. The values Gae·Φ and Δ i.e. may be values defined by the function of an air flow from the blower of the air conditioner and the refrigerant temperature Tre on a basis of experimental results.

As understood clearly from the above descriptions, when the engine is maintained in its normal running operation during running of the vehicle with the air conditioner equipped, estimated or measured are a physical value (for instance a refrigerant flow quantity Gr) having direct relationship with the compressor under the normal running operation of the engine and a rotational speed Nc of the compressor under the normal running operation of the engine. During the normal running operation of the engine, cooling ability of the air conditioner is maintained as it is, and estimated torque (Tn) of the compressor under the idling operation of the engine is obtained by using the above mentioned physical value and a predetermined rotational speed Nco of the compressor under the idling operation of the engine. During the normal running operation of the engine, the control valve 24 is previously adjusted on a basis of the estimated driving torque (Tn) taking account of phenomena at the idling operation of the engine.

Even if a rotational speed of the engine therefore decreases suddenly to increase driving torque of the compressor suddenly when operation of the engine changes from the normal running operation to the idling operation, it may be ensured to prevent the engine from its stalling operation without excessively dropping of the engine output torque or the engine rotational speed. As a result, the idling rotational speed of the engine may be set in the maximum value to thereby ensure improvement of fuel consumption.

In addition, the Japanese publication No. 218670/1987 discloses the following prior arts.

(1) There is provided a variable capacity type compressor having a slant plate which is provided within a housing and swung by rotation of a driving shaft along the axial of the driving shaft. A slant angle of the slant plate is controlled to control stroke of a piston. A capacity of the compressor is controlled in accordance with the stroke of the piston.

(2) A member to be detected is mounted on an outer peripheral portion of the slant plate, and a detector is mounted on the housing to generate a detecting or pulse signal at each time when the member to be detected passes through in accordance with swing of the slant plate, (3) The detector is located between a central point of the minimum swinging trace line of the slant plate and a piston side terminal point of the minimum swinging trace line.

(4) The actual rotational speed of the compressor and the actual slant angle of the slant plate are detected on a basis of the detecting signal from the detector.

Thus, with the prior art, a slant angle of the slant plate is calculated as a value directly related to driving torque of the compressor during the normal running operation of the engine. Furthermore, the actual rotational speed of the compressor during the normal running operation is calculated. As a result, it is possible to construct the present invention with the prior art of the Japanese publication No. 218670/1987. In this case, the above-mentioned swinging slant angle may be numerical information capable of enoughly calculating or measuring driving torque of the compressor in the present invention.

The U.S. Pat. No. 4,856,291 issued on Aug. 15, 1989 discloses the following prior arts.

(1) There is provided a variable capacity type compressor which changes suction pressure of refrigerant gas in accordance with heat load acting on an air conditioner for an automotive vehicle.

(2) There is also provided such heat load detecting means as an in-car temperature sensor, an ambient temperature sensor and a position sensor for detecting an opening position of a mix door, and the like.

(3) Suction pressure calculating means is provided to calculate a suction pressure set value Ps in accordance with outputs from the heat load detecting means and a predetermined function (G). Predetermined driving torque (T) for the compressor is calculated in accordance with the set value Ps and the heat load.

(4) During an idling operation of an engine, an idling up quantity is calculated by using the driving torque (T) and a function (W) to perform idling up control.

(5) During normal running operation of the engine, a control current is calculated on a basis of the set value Ps and a function (X), The control current is supplied to a solenoid of an electromagnetic actuator to determine a slant angle of the slant plate so as to adjust a discharge amount of refrigerant of the compressor.

Thus, it is possible to construct the present invention with the prior arts of U.S. Pat. No. 4,856,291. In this instance, the set value Ps or the control current may be utilized as a value directly related to driving torque of the compressor in normal running operation of the engine.

What is claimed is:

1. An idling speed control system for an engine of an automotive vehicle which is equipped with a refrigeration circuit for circulating refrigerant through a compressor, which is variable in a capacity of the discharged refrigerant, driven by the engine, a condenser and an evaporator, the idling speed control system comprising:
    control means for controlling a quantity of an air flow sucked into a combustion chamber of the engine,
    detecting means for detecting numerical information required for measuring or calculating a first influence degree given to an output of the engine by the compressor during operation of the refrigeration circuit,
    estimating means for estimating, in accordance with said numerical information, a second influence degree which will be given to the engine output by the compressor and will be required for maintaining cooling ability of the refrigeration circuit in a predetermined state under condition that the engine drives the compressor at a predetermined idling speed, and
    output means for outputting a control signal dependent on said estimated second influence degree to said control means prior to idling operation of the engine and for rendering said control means controlling said quantity of the air flow in accordance with said estimated second influence degree.

2. An idling speed control system as claimed in claim 1, wherein said first influence degree given to the engine is driving torque for the compressor, and said second estimated influence degree is estimated driving torque for the compressor under the idling operation of the engine.

3. An idling speed control system as claimed in claim 1, wherein said numerical information detected by said detecting means is used for measuring or calculating a quantity of the refrigerant circulating in the refrigeration circuit.

4. An idling speed control system as claimed in claim 1, wherein the compressor is arranged to require large driving torque as the capacity of the compressor increases in accordance with a decrease of a rotational speed of the compressor under a predetermined quantity of refrigerant circulating through the refrigeration circuit.

5. An idling speed control system as claimed in claim 2, wherein said output means is arranged to estimate a control signal previously dependent on said estimated driving torque when the engine is maintaining a previous operation to the idling operation and to output said control signal to said control means prior to the idling operation of the engine.

6. An idling speed control system as claimed in claim 1, said numerical information detected by said detecting means includes an ambient temperature of the vehicle, a rotational speed of the compressor, refrigerant pressure in the refrigeration circuit and a speed of the vehicle.

7. An idling speed control system as claimed in claim 2, wherein said output means has a first means for determining as to whether or not the engine is maintaining the idling operation, a second means for calculating a magnitude of said control signal in accordance with said estimated driving torque, and a third means for outputting said calculated control signal to said control means when said first means has determined that the engine is not maintaining the idling operation.

8. An idling speed control system as claimed in claim 4, said numerical information is obtained on a basis of the rotational speed and the capacity of the compressor.

9. An idling speed control system as claimed in claim 1, wherein said numerical information is associated with driving power given to the compressor by the engine in the operating of the refrigeration circuit.

10. An idling speed control system as claimed in claim 3, wherein the quantity of the refrigerant is measured or calculated when the engine is in prior condition to the idling operation.

11. An idling speed control system for an engine driving at least a refrigeration circuit for circulating refrigerant through a compressor, which is variable in a capacity of the discharged refrigerant, driven by the engine having a throttle valve, a condenser and an evaporator, the idling speed control system comprising:

control means for controlling a quantity of an air flow bypassing the throttle valve disposed in a suction passage of the engine and sucked into a combustion chamber of the engine, means for determining as to whether or not the engine is maintained in an idling operation thereof, means for calculating a value related directly to driving torque given to the compressor by the engine, and a rotational speed of the compressor during normal running operation of the engine previous to the idling operation, means for calculating driving torque required for the compressor which is maintaining cooling ability of the refrigeration circuit upon the idling operation of the engine on a basis of said calculated value and a predetermined rotational speed of the compressor under the idling operation, and means for calculating a control value on a basis of said calculated driving torque and outputting said control value during the normal running operation of the engine to previously control said control means on a basis of said outputted control value.

* * * * *